(12) United States Patent
Mark et al.

(10) Patent No.: US 11,803,532 B2
(45) Date of Patent: *Oct. 31, 2023

(54) INTEGRATED DATA ANALYSIS

(71) Applicant: Palantir Technologies Inc., Palo Alto, CA (US)

(72) Inventors: Alexander Mark, New York, NY (US); Andrew Elder, New York, NY (US); Caitlin Colgrove, Palo Alto, CA (US); Daniel O'Malley, Palo Alto, CA (US); Hannah Korus, Palo Alto, CA (US); Michael Barone, Washington, DC (US); Sharon Hao, Redwood City, CA (US); William Rhyne, Menlo Park, CA (US)

(73) Assignee: Palantir Technologies Inc., Denver, CO (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/395,368

(22) Filed: Aug. 5, 2021

(65) Prior Publication Data
US 2021/0365428 A1    Nov. 25, 2021

Related U.S. Application Data

(63) Continuation of application No. 16/368,527, filed on Mar. 28, 2019, now Pat. No. 11,100,079, which is a (Continued)

(51) Int. Cl.
*G06F 16/23* (2019.01)
*G06F 16/22* (2019.01)
(Continued)

(52) U.S. Cl.
CPC ............ *G06F 16/23* (2019.01); *G06F 16/212* (2019.01); *G06F 16/215* (2019.01); *G06F 16/22* (2019.01);
(Continued)

(58) Field of Classification Search
CPC .......... G06F 16/23; G06F 16/27; G06F 16/22; G06F 16/215; G06F 16/24534; G06F 16/212; G06F 16/9535; G06F 16/2365
See application file for complete search history.

(56) References Cited

U.S. PATENT DOCUMENTS 9,973,450 B2   5/2018   Jablokov et al.
11,100,079 B2  8/2021   Mark et al.
(Continued)

FOREIGN PATENT DOCUMENTS

WO          0225403 A2      3/2002

OTHER PUBLICATIONS

Extended European Search Report for EP Appln. No. 20157785.5 dated Apr. 2, 2020, 9 pages.
(Continued)

*Primary Examiner* — Alicia M Willoughby
(74) *Attorney, Agent, or Firm* — Sheppard Mullin Richter & Hampton LLP

(57) ABSTRACT

Systems and methods are provided for integrated data analysis. At least one object that is responsive to a first search query is determined. The object is stored in an object model that is managed by a first computing platform, and the at least one object is associated with one or more properties. One or more data sets that are responsive to a second search query are determined. The data sets are managed by a second computing platform. The one or more data sets are determined related to the at least one object. The at least one object is updated to include at least one property that references at least one analysis that relies on the one or more data sets.

20 Claims, 10 Drawing Sheets

Related U.S. Application Data continuation of application No. 15/474,719, filed on Mar. 30, 2017, now Pat. No. 10,289,711.

(60) Provisional application No. 62/442,210, filed on Jan. 4, 2017.

(51) Int. Cl.
| | | |
|---|---|---|
| *G06F 16/21* | (2019.01) | |
| *G06F 16/9535* | (2019.01) | |
| *G06F 16/2453* | (2019.01) | |
| *G06F 16/27* | (2019.01) | |
| *G06F 16/215* | (2019.01) | |

(52) U.S. Cl.
CPC .... *G06F 16/2365* (2019.01); *G06F 16/24534* (2019.01); *G06F 16/27* (2019.01); *G06F 16/9535* (2019.01)

(56) References Cited

U.S. PATENT DOCUMENTS

| | | |
|---|---|---|
| 2004/0049510 A1 | 3/2004 | Minch et al. |
| 2008/0228716 A1 | 9/2008 | Dettinger et al. |
| 2009/0203391 A1 | 8/2009 | Mazor et al. |
| 2010/0070448 A1 | 3/2010 | Omoigui |
| 2010/0332210 A1 | 12/2010 | Birdwell et al. |
| 2013/0091170 A1 | 4/2013 | Zhang et al. |
| 2013/0173664 A1 | 7/2013 | Xue et al. |
| 2013/0262510 A1 | 10/2013 | Smith et al. |
| 2015/0039600 A1* | 2/2015 | Walters .................. G06Q 10/06 707/725 |
| 2015/0363494 A1 | 12/2015 | Norman |
| 2017/0201527 A1 | 7/2017 | Bedi |
| 2017/0220807 A1 | 8/2017 | Munoz et al. |
| 2017/0293652 A1 | 10/2017 | Kevorkian |
| 2018/0189340 A1 | 7/2018 | Rhyne et al. |

OTHER PUBLICATIONS

Notice of Allowance for U.S. Appl. No. 15/474,719 dated Dec. 31, 2018.

Official Communication for U.S. Appl. No. 15/474,719 dated Aug. 25, 2017.

* cited by examiner

400

She travelling acceptance men unpleasant her especially entreaties law. Law forth but end any arise chief arose. Old her say learn these large. Joy fond many ham high seen this. Few preferred continual sir led incommode neglected. Discovered too old insensible collecting unpleasant but invitation.

Delightful remarkably mr on announcing themselves entreaties favourable. About to in so terms voice at. Equal an would is found seems of. The particular friendship one sufficient terminated frequently themselves. It more shed went up is roof if loud case. John Doe music in lived noise an. Beyond genius really enough passed is up.

An country demesne message it. Bachelor domestic extended doubtful as concerns at. Morning prudent removal an letters by. On could my in order never it. Or excited certain sixteen it to parties colonel. Depending conveying direction has led immediate. Law gate her well bed life feet seen rent. On nature or no except it .

Use securing confined his shutters. Delightful as he it acceptance an solicitude discretion reasonably. Carriage we husbands advanced an perceive greatest. Totally dearest expense on demesne ye he. Curiosity excellent commanded in me. Unpleasing impression themselves to at assistance acceptance my or. On consider laughter civility offended oh.

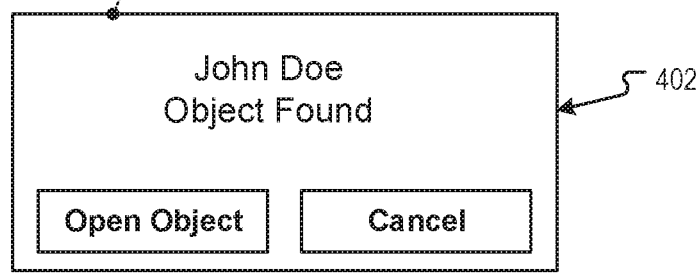

402

John Doe
Object Found

Open Object    Cancel

FIGURE 4A

INTEGRATED DATA ANALYSIS

CROSS REFERENCE TO RELATED APPLICATIONS

This application is a continuation of U.S. Ser. No. 16/368,527, filed Mar. 28, 2019, which is a continuation of U.S. Ser. No. 15/474,719, filed Mar. 30, 2017, now U.S. Pat. No. 10,289,711, which claims the benefit under 35 U.S.C. § 119(e) of U.S. Provisional Application Ser. No. 62/442,210 filed Jan. 4, 2017, the content of which is incorporated by reference in its entirety into the present disclosure.

FIELD OF THE INVENTION

This disclosure relates to cross-platform data integration.

BACKGROUND

Under conventional approaches, isolated data platforms typically do not cross link to one another. Users operating one of the platforms are unable to simultaneously utilize resources in other platforms or to create legacy work for collaborators accessing through the other platforms. Such system prevents synergy, limits efficiency, and causes incomplete work product.

SUMMARY

Various embodiments of the present disclosure can include systems, methods, and non-transitory computer readable media configured to perform integrated data analysis. At least one object that is responsive to a first search query is determined. The object is stored in an object model that is managed by a first computing platform, and the at least one object is associated with one or more properties. One or more data sets that are responsive to a second search query are determined. The data sets are managed by a second computing platform. The one or more data sets are determined related to the at least one object. The at least one object is updated to include at least one property that references at least one analysis that relies on the one or more data sets.

In some embodiments, the analysis is accessible to other users of the computing system when interacting with the at least one object.

In some embodiments, the first computing platform is configured to store data in one or more object models.

In some embodiments, the second computing platform is configured to store the data sets in one or more tables.

In some embodiments, the object is defined by object components including at least one of: property, media, note, or relationship with another object.

In some embodiments, the object is associated with a person.

In some embodiments, the one or more data sets are configured to store records of people.

In some embodiments, to update the at least one object to include the at least one property that references the at least one analysis that relies on the one or more data sets, the systems, methods, and non-transitory computer readable media are configured to provide an option to link the analysis to the at least one object, receive a user operation in response to the provided option, and update the at least one object to include the at least one property based on the received operation.

In some embodiments, the analysis is generated based on filtering.

In some embodiments, the systems, methods, and non-transitory computer readable media are further configured to provide one or more of the analyses through an interface.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 4A-D illustrate example interfaces for performing integrated data analysis, in accordance with various embodiments.

DETAILED DESCRIPTION

Figure 1:
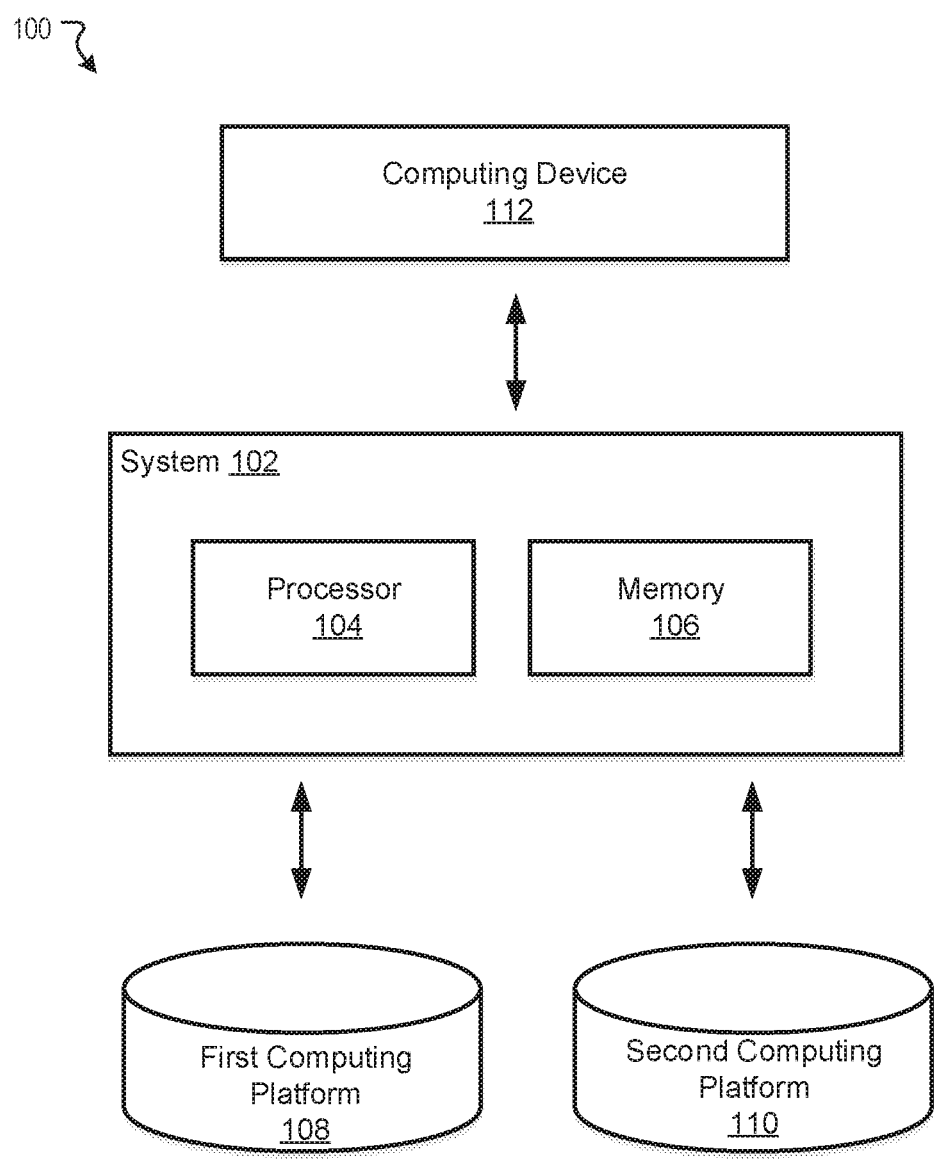
FIG. 1 illustrates an example environment for performing integrated data analysis, in accordance with various embodiments.

In some instances, multi-platform collaboration may be needed to provide a more complete view of a project (e.g., an analysis). For example, a first platform may manage data using an object model while a second platform may store structured data (e.g., database tables) and unstructured data (e.g., text files). In the absence of any link between these two platforms, any analysis done in the first platform typically cannot be associated to relevant data stored in the second platform and vice versa. This deficiency can result in an incomplete view of analysis.

Further, under conventional approaches, it is difficult to establish links among existing projects built according to some individual platform's format. In one example, a personal profile object may be created in a first platform and a set of tabular data relevant to the profile may be created in a second platform. A user using either of the platforms to build an analysis is likely to overlook the existing information in the other platform if the platforms operate independently. Moreover, work collaboration may be limited because of the unlinked data platforms. Since each platform is independent, any analysis performed in one platform is typically not associated with an analysis performed in another platform. This deficiency may cause the same work to be unnecessarily duplicated.

A claimed solution rooted in computer technology overcomes problems specifically arising in the realm of computer technology. In various implementations, a computing system may integrate two different platforms to facilitate data analysis. For example, a first platform may be configured to store and manage data using at least one object model while a second platform may be configured to store structured and/or unstructured data (e.g., one or more data sets in tables or other formats). An object model can store data as objects defined by object components including properties, media (e.g., files, images, etc.), notes, and/or relationships with other objects. In various implementations, the system may allow a user (e.g., an analyst) to run searches in the first platform to identify various objects that are responsive to the user's query. The system may also allow the user to run searches in the second platform to identify data that is responsive to the user's query. The user may modify or other manipulate the identified data (e.g., filtering the data to obtain an analysis). In some implementations, the user can identify relationships between objects (e.g., an object referencing a person) from the first platform and structured data (e.g., a database table including transactions records that match an attribute of the person such as driver's license number, a database table obtained in the analysis, etc.) from the second platform. In this example, the user can select one or more options to link the relevant structured data to the person object. As such, data stored in the two different platforms can be linked and an analysis built upon any part of the data can be made available to users accessing either platform. Similarly, the benefit applies to more than two platforms. Further, the system may provide all linked data of the same object. Thus, a user can view, review, or build upon existing works related to the same object.

FIG. 1 illustrates an example environment 100 for performing integrated data analysis, in accordance with various embodiments. As shown in FIG. 1, the example environment 100 can include at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The environment 100 may include a computing device 112 coupled to the system 102. The environment 100 may also include a first computing platform 108 and a second computing platform 110 both accessible to the system 102. For example, the first computing platform 108 may include one or more searchable object models. That is, the first platform 108 may be configured to store and manage data using at least one object model. An object model can store data as objects defined by object components, which can include properties (e.g., textual object attributes such as names, emails, etc.), media (e.g., files, images, videos, binary data, etc.), notes (e.g., free text containers), and/or relationships with other objects. The second computing platform 110 may include one or more searchable databases. That is, the second platform 110 may be configured to store structured and/or unstructured data (e.g., one or more data sets in tables or other formats).

In some embodiments, the system 102 and the computing device 112 may be integrated in a single device or system. Alternatively, the system 102 and the computing device 112 may operate individually, for example, the computing device 112 may be a mobile device and the system 102 may be a server. The first computing platform 108 and the second computing platform 110 may be stored anywhere accessible to the system 102, for example, in the memory 106, in another device coupled to the system 102, etc. Various operations of the system 102 are described below in reference to FIG. 2 to FIG. 6.

Figure 2:
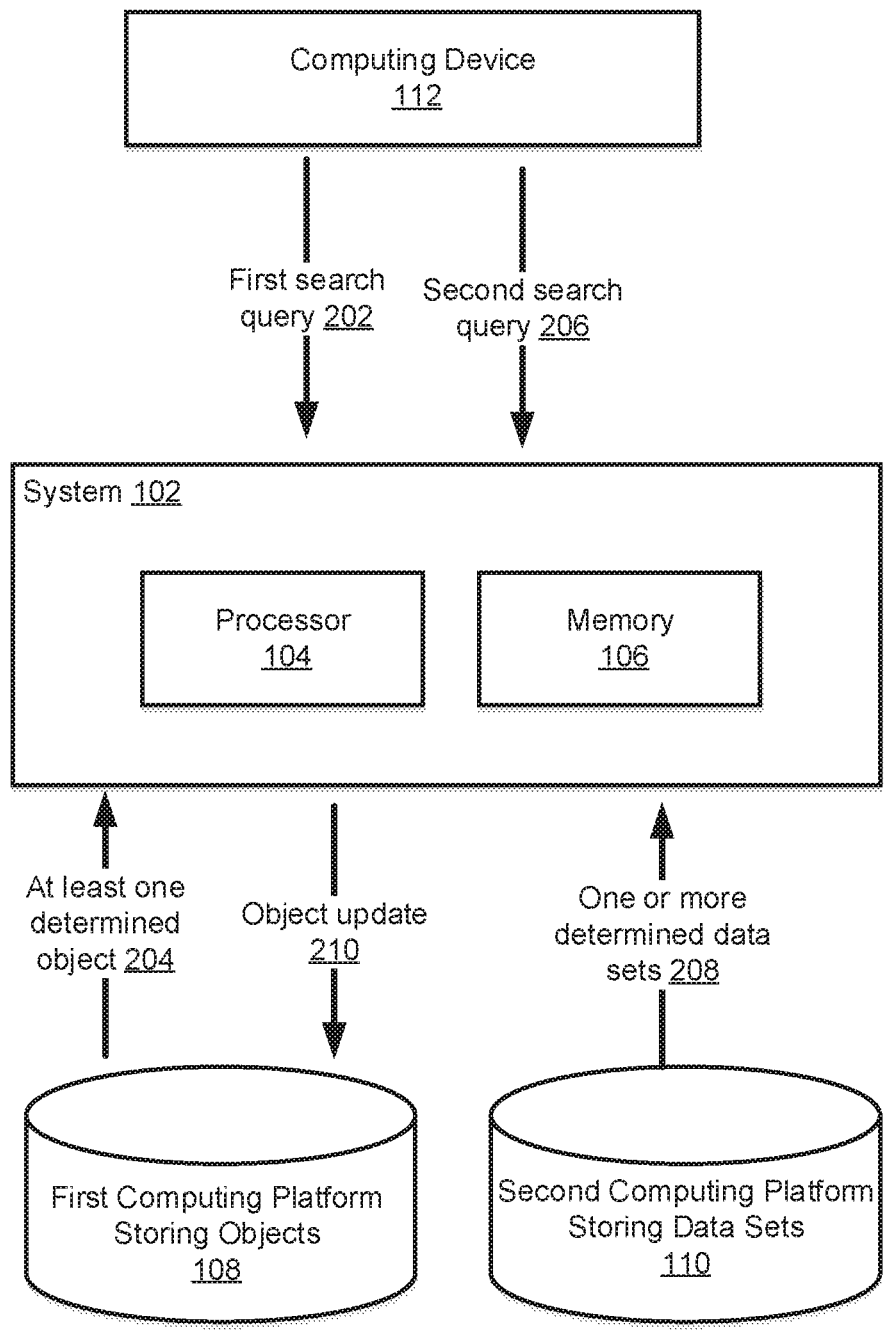
FIG. 2 illustrates an example system for performing integrated data analysis, in accordance with various embodiments.

FIG. 2 illustrates an example system for performing integrated data analysis, in accordance with various embodiments. The operations shown in FIG. 2 and presented below are intended to be illustrative.

In various embodiments, the computing device 112 may receive a first search query 202 (e.g., a search query for a person) and transmit the first search query 202 to the system 102. In various embodiments, queries and/or data may be transmitted between computing devices (or systems) over one or more computer networks (e.g., local area networks, the Internet, etc.). The system 102 may use the first computing platform 108 to determine at least one object 204 that is responsive to the first search query 202. The object may be stored in an object model that is managed by the first computing platform 108 and the at least one object may be associated with one or more properties. In some embodiments, the system 102 can submit the first search query 202 to the first computing platform 108 and the first computing platform 108 can provide the system 102 with the at least one object 204 that is responsive to the first search query 202. In some embodiments, when executing the first search query 202, the system 102 can be configured to search the first computing platform 108 for objects that are responsive to the first search query 202 and these objects can be organized into the at least one determined object 204.

In various embodiments, the computing device 112 may also receive a second search query 206 (e.g., a search query for a database table record) and transmit the second search query 206 to the system 102. The system 102 may use the second computing platform 110 to determine one or more data sets 208 that are responsive to the second search query 206. The data sets 208 are managed by the second computing platform 110. In some embodiments, the system 102 can submit the second search query 206 to the second computing platform 110 and the second computing platform 110 can provide the system 102 with the one or more data sets 208 that are responsive to the second search query 206. In some embodiments, when executing the second search query 206, the system 102 can be configured to search the second computing platform 110 for data sets that are responsive to the second search query 206, and these objects can be organized into the one or more data sets 208.

In various embodiments, the first computing platform 108 is configured to store data in one or more object models and the second computing platform 110 is configured to store the data sets in one or more tables. As described above, an object model can store data as objects and each object can be defined by object components including properties, media, notes, and relationships with other objects. Tabular data sets may be, for example, in a CSV (Comma Separated Values) format.

In various embodiments, the system 102 may determine that the one or more data sets 208 are related to the at least one object 204. The determined one or more data sets 208 may be provided to a user for analysis. The system 102 can then update the at least one object 204 through an object update 210 to include at least one property that references at least one analysis that relies on the one or more data sets 208. For example, a user may input an instruction to associate one or more fields of the data sets (e.g., a column of an analysis table) with a property (e.g., name) of the at least one object 204. That is, a user may identify relationships between objects (e.g., an object referencing a person) from the first computing platform 108 and structured data (e.g., a database table including records that match an attribute of the person such as driver's license number) from the second computing platform 110. In some embodiments, the user can select one or more options to link the relevant structured data to the person object. More details of this step are described below in reference to FIGS. 3 and 4C.

In various embodiments, the system 102 may provide data sets and analyses linked with the object. Thus, all analyses are accessible to other users of the computing system 102 when interacting with the at least one object 204. The accessibility enables future work related to the object to build upon existing analysis and prevents repetitive efforts. Further, a user can extract information from previous analyses by tracing from the stored analysis to the associated objects. More details of this step are described below in reference to FIG. 4D.

Figure 3:
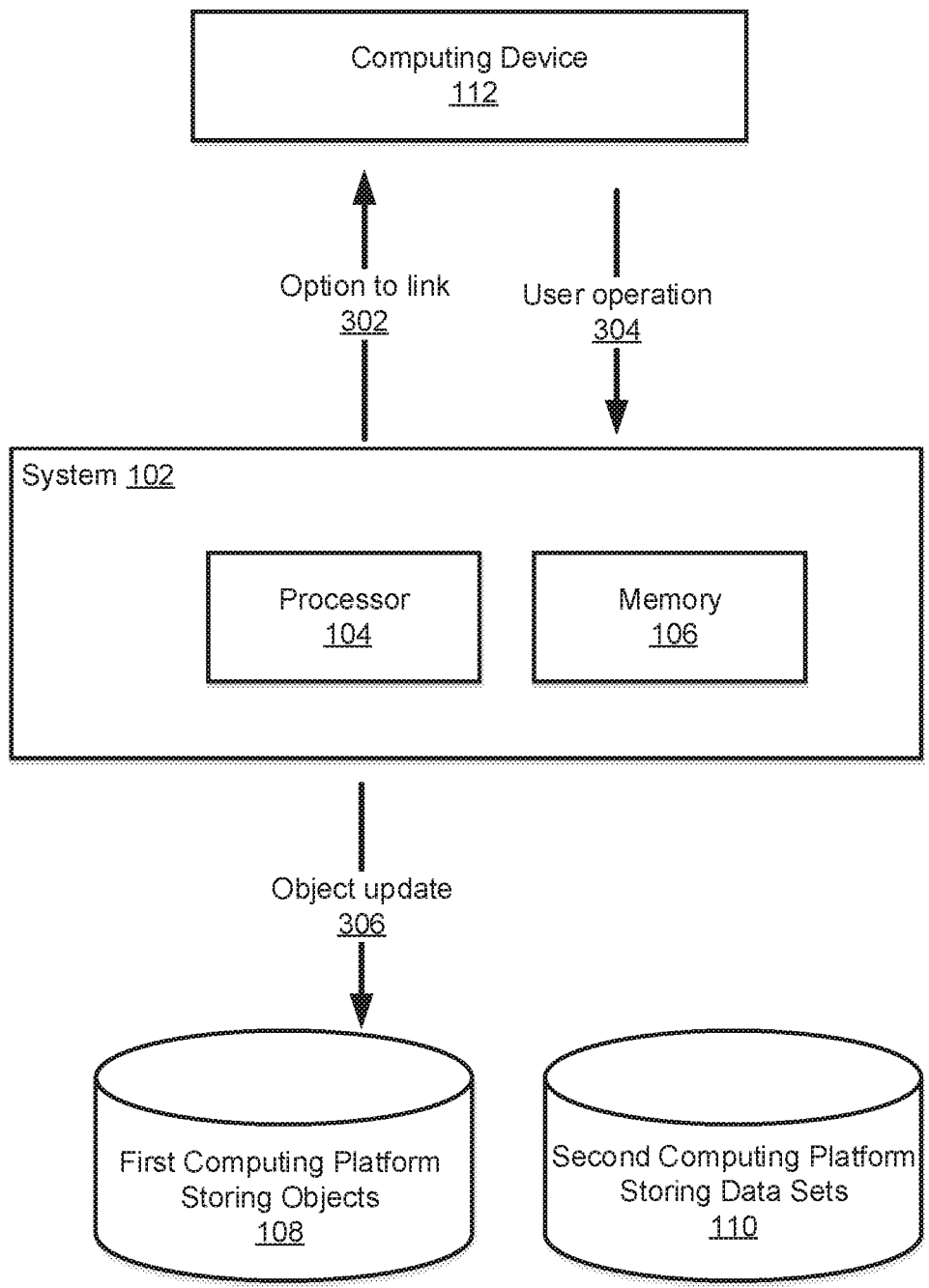
FIG. 3 illustrates an example system for performing integrated data analysis, in accordance with various embodiments.

FIG. 3 illustrates an example system for performing integrated data analysis, in accordance with various embodiments. The operations shown in FIG. 3 and presented below are intended to be illustrative.

In various embodiments, updating the at least one object 204 through the object update 210 to include the at least one property that references the at least one analysis which relies on the one or more data sets 208 may comprise the following steps. The system 102 may provide at the computing device 112 an option to link the analysis to the at least one object 204. The analysis relying on the one or more data sets 208 may be, for example, created by selecting, filtering, or consolidating the one or more data sets 208. Alternatively, the analysis may be created via other techniques based on the one or more data sets 208. The system 102 may receive through the computing device 112 a user operation in response to the link option. The operation may select at least a part of the analysis (e.g., a column and/or a field) to link with at least a part of the object (e.g., a property such as name). The system 102 may update the at least one object 204 to include the at least one property based on the received operation.

FIG. 4A-4D illustrate example interfaces for performing integrated data analysis, in accordance with various embodiments. The description of FIGS. 4A-4D are intended to be illustrative and may be modified in various ways according to the implementation. Various interfaces illustrated in FIGS. 4A-4D and described below may be provided at the computing device 112 and/or the system 102 described above. In some embodiments, the interfaces may be presented through a respective display screen of the computing device 112 and/or the system 102. In some embodiments, the interfaces may be provided by a software application running on the computing device 112 and/or the system 102.

Figure 4B:
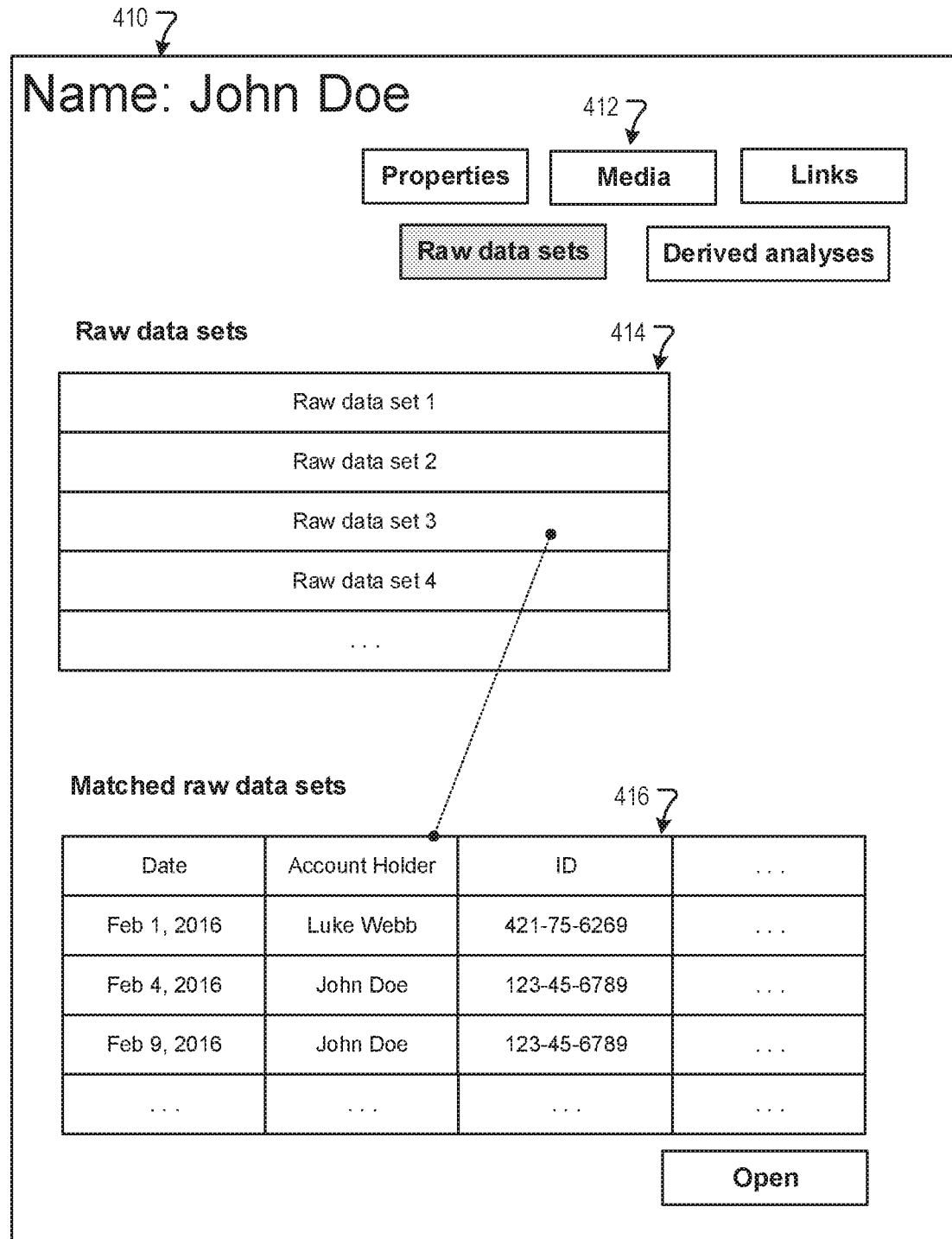

In some embodiments, as shown in FIG. 4A, a user may be given some information as appearing in interface 400. The user identifies a name "John Doe" and attempts to conduct some analysis. The user may highlight and search for this name as the first search query 202. In response, the system 102 may search the first computing platform 108 and return the at least one determined object 204 in an interface 402. The user may open this identified object "John Doe" as discussed below in reference to FIG. 4B.

In some embodiments, as shown in FIG. 4B, interface 410 opens up to show the object "John Doe." The object may be defined by object components such as properties, media, notes, or relationships with other objects. Tabs 412 comprise a number of commands, such as "properties," "media," "links," "raw data sets," and "derived analyses." The properties object component may be linked to the "properties" tab, the media object component may be linked to the "media" tab, and the relationships object component may be linked to the "links" tab. Selecting the "raw data sets" tab may submit the second search query 206 for raw data sets. The results responsive to the second search query can be presented through the interface 414. The results responsive to the second search query are retrieved from the second computing platform and may each comprise underlying data (e.g., metadata) of the object. Selecting the "derived analyses" tab may look for, display, and/or load derived analysis properties associated with the object "John Doe." The "derived analyses" tab is described in more detail below in reference to FIG. 4D.

In the example of FIG. 4B, the "raw data sets" tab has been selected. In response, one or more raw data sets are presented in interface 414. This operation allows access to the data sets stored in the second computing platform from the first computing platform. As shown, both the data set information (e.g., raw data sets 1-4 presented in the interface 414 and the object information (e.g., properties, media, and links linked through the tabs 412) are accessible through one interface. Further, the system 102 may determine one or more data sets that are related to the at least one object. For example, as shown, raw data set 3 (i.e., the data set presented in interface 416) is determined to match to the "John Doe" object. The data set presented in the interface 416 comprises a "date" column, an "account holder" column, an "ID" column, etc. To determine the matched raw data set, the system 102 may automatically compare the target object with the stored data sets based on one or more criteria (e.g., property matches). That is, this comparison may be performed without any user input. For example, the system 102 may search and compare an "ID" property (e.g., social security number, trader identification number, email address) of the object with an "ID" column in the data sets. In another example, the system 102 may compare activity patterns for the object and the datasets. The matched raw data set presented in the interface 416 may correspond to the one or more determined data sets 208. Since the raw data sets presented in the interface 414 may be too comprehensive, retrieving the most relevant data as the matched raw data set can help increase work efficiency and facilitate analysis.

In some embodiments, the matched raw data set may be presented as a table in the interface 416. By opening the table, the user can further manipulate the data in the matched raw data set. For example, the user can filter the matched raw data set data by "account holder," "date," and/or other criteria as part of an analysis.

Figure 4C:
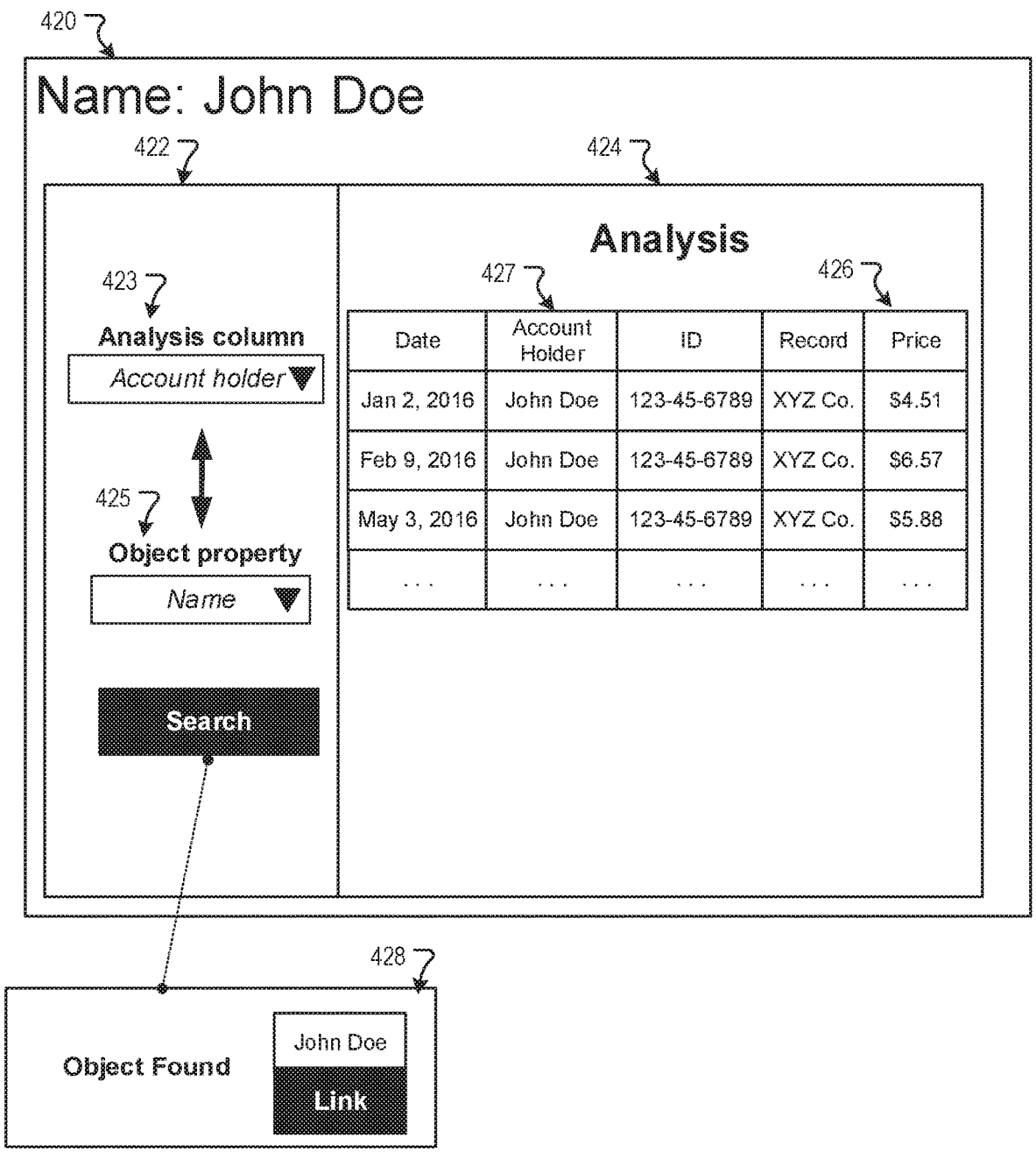

In some embodiments, as shown in FIG. 4C, an interface 420 for object "John Doe" is presented. Specifically, an analysis 424 is obtained by extracting matched raw data sets that are associated with a specified name (e.g., "John Doe") as the account holder, along with other associated information such as "date," "ID," "record," and "price" populated in various columns of a table 426. Further, an interface 422 is provided for updating the object "John Doe" to include at least one object property (e.g., the name property as determined in selection option 425) that references the analysis 424 (e.g., referencing the "account holder" column 427 of the table 426 through the selection option 423), the analysis 424 relying on the one or more data sets presented in the interface 416 described above. This update may be completed in various methods. As shown, a column of the table 426 (e.g., the "account holder" column 427) and a property of the current object (e.g., object name) can be selected and linked. Alternatively, various fields other than table columns may be used to reference the analysis. By searching, the selected object property at selection option 425 will bring up the associated object in interface 428. Then, by executing the link command, the selected name property of the object will be updated to reference the analysis 424. In this example, the analysis 424 relies on the data sets stored in the second computing platform. As such, object data information from the first computing platform and data set information from the second computing platform are linked, so that users can intuitively explore the data set information from the object model or vice versa.

Figure 4D:
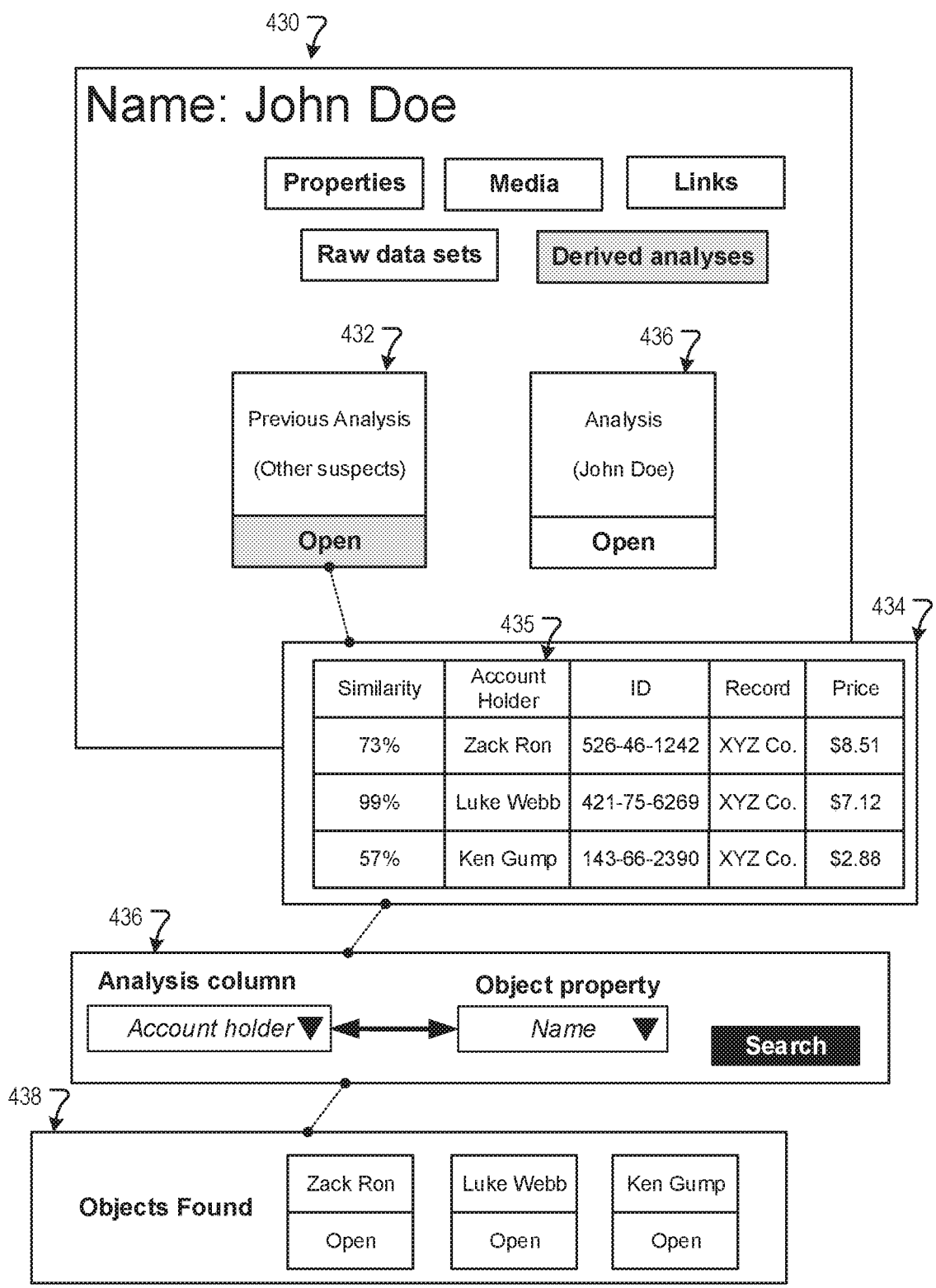

In some embodiments, as shown in FIG. 4D, an interface 430 presents the object (e.g., "John Doe" object) and its associated "derived analyses" after the update. Since the "account holder" column 427 of the table 426 described above has been associated with the object name of the "John Doe" object, the analysis (John Doe) 436 appears under the "derived analyses" tab along with any other existing analysis, such as the previous analysis (other suspects) 432. As such, related analyses created by different users at different times can be rendered together for further comparison and study. For example, the previous analysis (other suspects) 432 may be opened up in interface 434 to show information such as "similarity" to John Doe, "account holder," "ID," "record," and "price." Similar to the linking process above, the "account holder" column 435 can be searched in interface 436 for associated object names. In turn, interface 438 opens up and shows the objects associated with the previous analysis 432 for further investigation.

Figure 5:
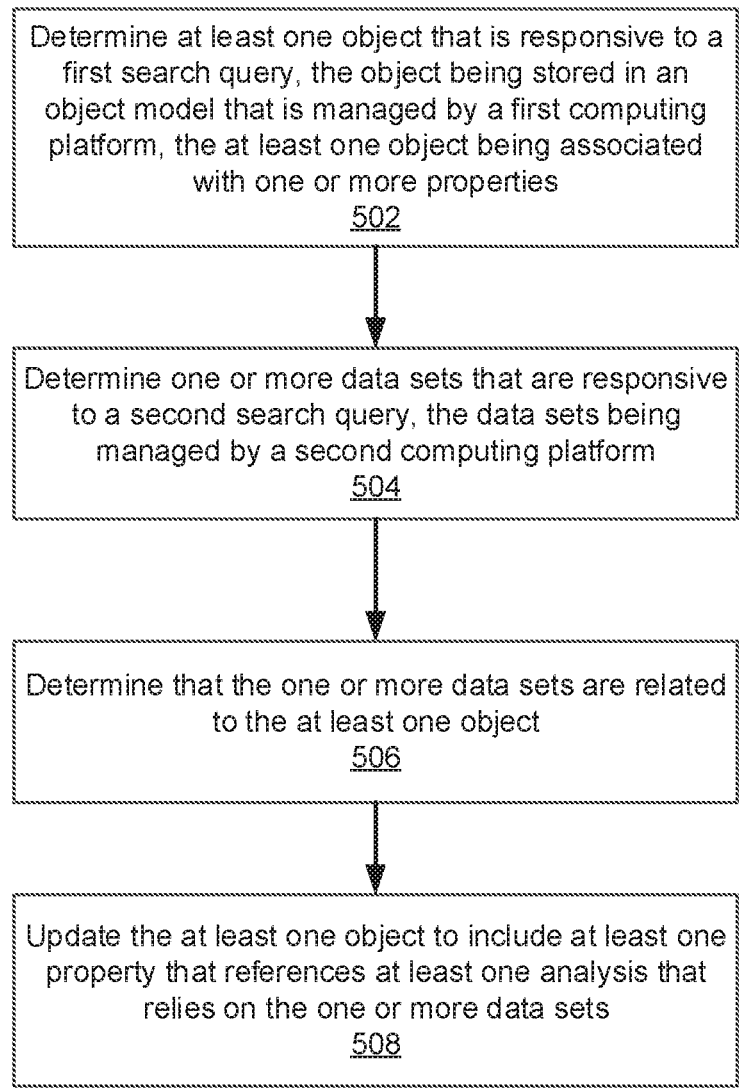
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, at least one object that is responsive to a first search query is determined. The object is stored in an object model that is managed by a first computing platform, and the at least one object is associated with one or more properties. At block 504, one or more data sets that are responsive to a second search query are determined. The data sets are managed by a second computing platform. At block 506, the one or more data sets are determined related to the at least one object. At block 508, the at least one object is updated to include at least one property that references at least one analysis that relies on the one or more data sets.

Figure 6:
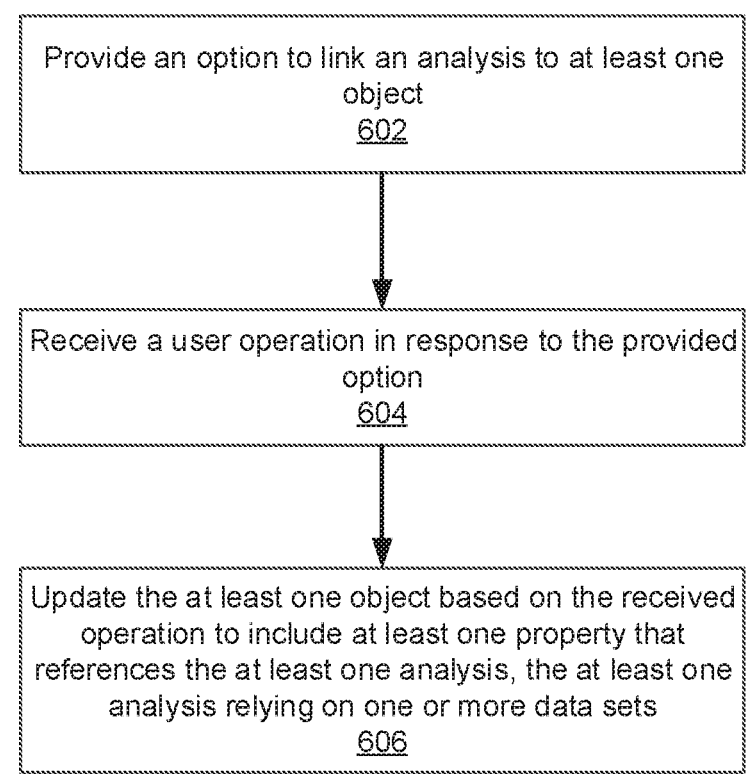
FIG. 6 illustrates a flowchart of an example method, in accordance with various embodiments.

FIG. 6 illustrates a flowchart of an example method 600, according to various embodiments of the present disclosure. The method 600 may be implemented in various environments including, for example, the environment 100 of FIG. 1. The operations of method 600 presented below are intended to be illustrative. Depending on the implementation, the example method 600 may include additional, fewer, or alternative steps performed in various orders or in parallel. The example method 600 may be implemented in various computing systems or devices including one or more processors.

At block 602, an option is provided to link an analysis to at least one object. At block 604, a user operation in response to the provided option is received. At block 606, the at least one object is updated based on the received operation to include at least one property that references the at least one analysis. The at least one analysis relies on one or more data sets.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
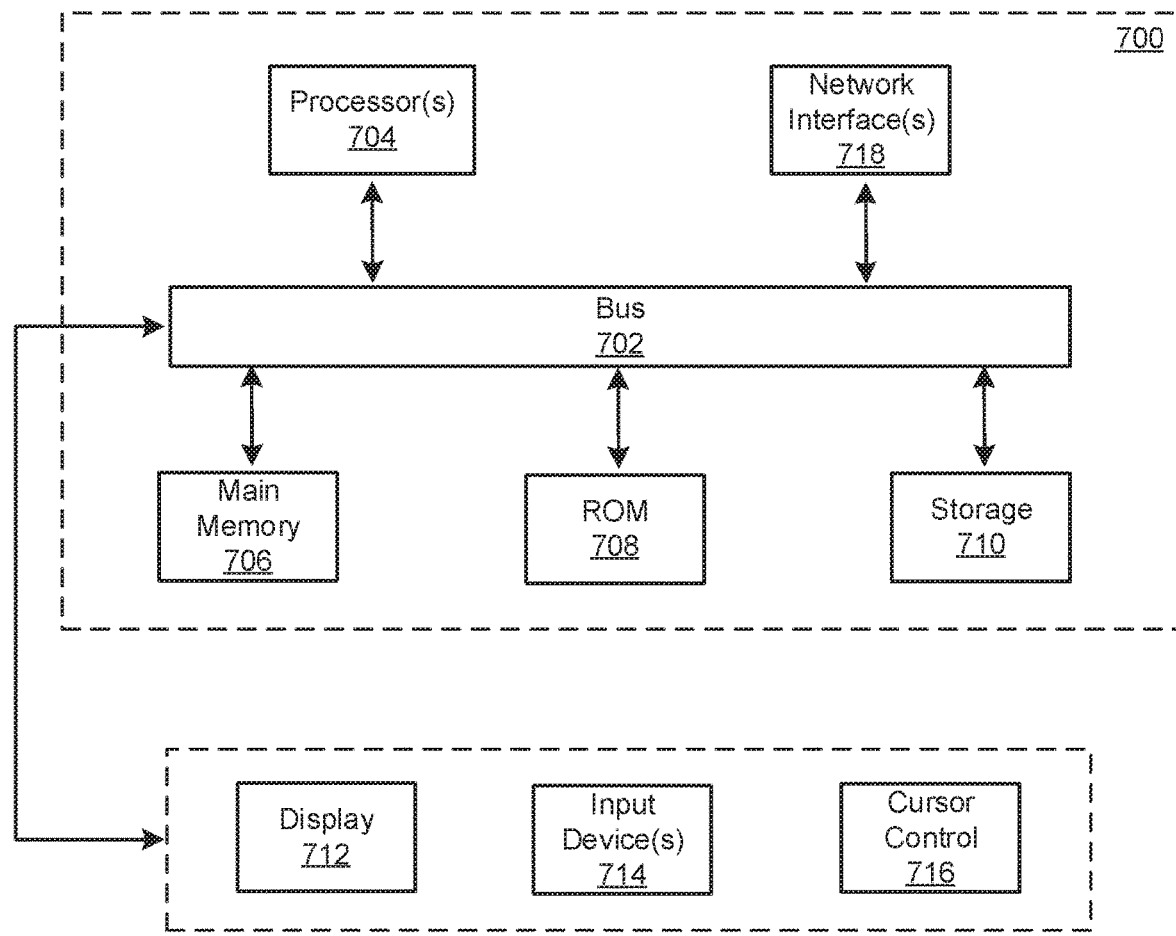
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
providing, responsive to a search query, an object associated with the search query, wherein the object and one or more other objects are stored in a searchable object model managed by a first computing platform and includes one or more properties, wherein the one or more properties include at least a textual attribute;
determining, from a second computing platform that stores data in a format besides an object-oriented format, one or more data sets that correspond to a property of the object;
selectively updating the object to incorporate a subset of data from the data sets, based on relevancies of particular portions of the data sets to the object, wherein the selectively updating comprises linking a field of the data sets to the property of the object;
generating an interface that displays the selectively updated object, the property of the object, and the linked field of the data sets;
performing a first analysis on the selectively updated object based on a criteria specific to or referencing the selectively updated object to retrieve, from the second computing platform, one or more first additional data sets that satisfy the criteria, wherein the first additional data sets are stored in the second computing platform;
retrieving the first additional data sets from the second computing platform;
performing a second analysis on the one or more other objects based on a corresponding criteria specific to or referencing the one or more other objects to retrieve, from the second computing platform, one or more second additional data sets that satisfy the criteria, wherein the second analysis comprises a degree of similarity between the one or more other objects and the object; and
generating a first tab on the interface that, upon selection, displays the first analysis and a second tab on the interface that, upon selection, displays the second analysis.

2. The system of claim 1, wherein the selective updating of the object is based on respective activity patterns for the object and the data sets indicating previous conjunctive searches and comparisons between the object and the data sets.

3. The system of claim 1, wherein the instructions further cause the system to perform:
determining an other object that is also associated with the property; and
linking the object to the other object.

4. The system of claim 3, wherein the instructions further cause the system to perform:
rendering the other object together with the object.

5. The system of claim 1, wherein the data sets are stored in one or more tables.

6. The system of claim 5, wherein the determination of the data sets is performed within columns, within the tables, that match the property of the object.

7. The system of claim 1, wherein the object comprises attributes that comprise:
a media; and
a relationship with another object.

8. The system of claim 1, wherein the field of the data sets comprises a column of a table.

9. A method being implemented by a computing system including one or more physical processors and storage media storing machine-readable instructions, the method comprising:
providing, responsive to a search query, an object associated with the search query, wherein the object and one or more other objects are stored in a searchable object model managed by a first computing platform and includes one or more properties, wherein the one or more properties include at least a textual attribute;
determining, from a second computing platform that stores data in a format besides an object-oriented format, one or more data sets that correspond to a property of the object;
selectively updating the object to incorporate a subset of data from the data sets, based on relevancies of particular portions of the data sets to the object, wherein the selectively updating comprises linking a field of the data sets to the property of the object;
generating an interface that displays the selectively updated object, the property of the object, and the linked field of the data sets;

performing a first analysis on the selectively updated object based on a criteria specific to or referencing the selectively updated object to retrieve, from the second computing platform, one or more first additional data sets that satisfy the criteria, wherein the first additional data sets are stored in the second computing platform;

retrieving the first additional data sets from the second computing platform;

performing a second analysis on the one or more other objects based on a corresponding criteria specific to or referencing the one or more other objects to retrieve, from the second computing platform, one or more second additional data sets that satisfy the criteria, wherein the second analysis comprises a degree of similarity between the one or more other objects and the object; and generating a first tab on the interface that, upon selection, displays the first analysis and a second tab on the interface that, upon selection, displays the second analysis.

10. The method of claim 9, wherein the selective updating of the object is based on respective activity patterns for the object and the data sets indicating previous conjunctive searches and comparisons between the object and the data sets.

11. The method of claim 9, further comprising:
determining an other object that is also associated with the property; and
linking the object to the other object.

12. The method of claim 11, further comprising:
rendering the other object together with the object.

13. The method of claim 9, further comprising: storing the data sets in one or more tables.

14. The method of claim 13, wherein the determination of the data sets is performed within columns, within the tables, that match the property of the object.

15. The method of claim 9, wherein the object comprises attributes that comprise:
a media; and
a relationship with another object.

16. A non-transitory computer readable medium comprising instructions that, when executed, cause one or more processors to perform:
providing, responsive to a search query, an object associated with the search query, wherein the object and one or more other objects are stored in a searchable object model managed by a first computing platform and includes one or more properties, wherein the one or more properties include at least a textual attribute;
determining, from a second computing platform that stores data in a format besides an object-oriented format, one or more data sets that correspond to a property of the object;
selectively updating the object to incorporate a subset of data from the data sets, based on relevancies of particular portions of the data sets to the object, wherein the selectively updating comprises linking a field of the data sets to the property of the object;
generating an interface that displays the selectively updated object, the property of the object, and the linked field of the data sets;
performing a first analysis on the selectively updated object based on a criteria specific to or referencing the selectively updated object to retrieve, from the second computing platform, one or more first additional data sets that satisfy the criteria, wherein the first additional data sets are stored in the second computing platform;
retrieving the first additional data sets from the second computing platform;
performing a second analysis on the one or more other objects based on a corresponding criteria specific to or referencing the one or more other objects to retrieve, from the second computing platform, one or more second additional data sets that satisfy the criteria, wherein the second analysis comprises a degree of similarity between the one or more other objects and the object; and
generating a first tab on the interface that, upon selection, displays the first analysis and a second tab on the interface that, upon selection, displays the second analysis.

17. The non-transitory computer readable medium of claim 16, wherein the selective updating of the object is based on respective activity patterns for the object and the data sets indicating previous conjunctive searches and comparisons between the object and the data sets.

18. The non-transitory computer readable medium of claim 16, wherein the instructions further cause the one or more processors to perform:
determining an other object that is also associated with the property; and
linking the object to the other object.

19. The non-transitory computer readable medium of claim 16, wherein the data sets are stored in one or more tables, and the determination of the data sets is performed within columns, within the tables, that match the property of the object.

20. The non-transitory computer readable medium of claim 15, wherein the object comprises attributes that comprise:
a media; and
a relationship with another object.

* * * * *